(12) United States Patent
Jarahnejad et al.

(10) Patent No.: US 10,903,536 B2
(45) Date of Patent: Jan. 26, 2021

(54) BATTERY AND A BATTERY THERMAL ARRANGEMENT (71) Applicant: Telefonaktiebolaget LM Ericsson (publ), Stockholm (SE)

(72) Inventors: Mariam Jarahnejad, Sundbyberg (SE); Klas Hedberg, Huddinge (SE); Stefan Skoglund, Stockholm (SE); David Gustafsson, Solna (SE); Alexandra Kenneberg, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 16/081,417

(22) PCT Filed: Apr. 25, 2016

(86) PCT No.: PCT/SE2016/050359
§ 371 (c)(1),
(2) Date: Aug. 30, 2018

(87) PCT Pub. No.: WO2017/188865
PCT Pub. Date: Nov. 2, 2017

(65) Prior Publication Data
US 2019/0319320 A1  Oct. 17, 2019

(51) Int. Cl.
*H01M 10/613* (2014.01)
*H01M 10/6557* (2014.01)

(52) U.S. Cl.
CPC ..... *H01M 10/6557* (2015.04); *H01M 10/613* (2015.04)

(58) Field of Classification Search
CPC ................ H01M 10/6557; H01M 10/613
See application file for complete search history.

(56) References Cited

U.S. PATENT DOCUMENTS

2005/0089750 A1*  4/2005  Ng ................. H01M 2/0242
429/120
2009/0087727 A1  4/2009  Harada et al.
(Continued)

FOREIGN PATENT DOCUMENTS

JP   H0773908 A    3/1995
JP   2011096465 A  5/2011

OTHER PUBLICATIONS

International Search Report and Written Opinion for Application No. PCT/SE2016/050359, dated Jun. 23, 2016, 11 pages.
(Continued)

*Primary Examiner* — Olatunji A Godo
(74) *Attorney, Agent, or Firm* — Sage Patent Group (57) ABSTRACT

A battery and battery thermal arrangement are provided. The battery comprises one or more battery blocks and a thermal insert configured adjacent to a first battery block or between two battery blocks, including the first battery block and a second battery block, the thermal insert comprising a channel for allowing a thermal medium flowing through the thermal insert, the thermal insert being in physical contact with at least a part of a side of the first battery block when filled with the thermal medium, the thermal insert further comprising an inlet and an outlet connectable to a circulation device for pumping the thermal medium through the thermal insert.

13 Claims, 11 Drawing Sheets

(56) References Cited

U.S. PATENT DOCUMENTS

| | | | |
|---|---|---|---|
| 2010/0276132 A1* | 11/2010 | Payne | F28D 15/0266 |
| | | | 165/169 |
| 2011/0206964 A1 | 8/2011 | Odumodu et al. | |
| 2011/0206967 A1* | 8/2011 | Itsuki | B60L 1/003 |
| | | | 429/120 |
| 2013/0171493 A1* | 7/2013 | Wayne | F28F 3/12 |
| | | | 429/120 |
| 2013/0189556 A1 | 7/2013 | Toepfer | |

OTHER PUBLICATIONS

"Generic Requirements for Electronic Equipment Cabinets (A module of FR-Reliability-Quality-01)," Jan. 3, 2013, 142 pages, Issue 4, Telcordia Technologies Generic Requirements GR-487-CORE (TTF Final Draft), Telcordia Technologies, Inc.

"Safety requirements for secondary batteries and battery installations—Part 2: Stationary batteries," Jun. 2010, 80 pages, Edition 1.0, International Standard, International Electrotechnical Commission, IEC 62485-2.

\* cited by examiner

BATTERY AND A BATTERY THERMAL ARRANGEMENT

CROSS-REFERENCE TO RELATED APPLICATIONS

This application is a National stage of International Application No. PCT/SE2016/050359, filed Apr. 25, 2016, which is hereby incorporated by reference.

TECHNICAL FIELD

The present disclosure relates to batteries and in particular to thermally management of batteries.

BACKGROUND

Today the solution for managing the temperatures of batteries is to heat and cool the air surrounding battery blocks inside a housing of the batteries. Different cooling technologies for batteries are applied such as active compressor cooling, Peltier coolers and forced convection battery cooling using direct air cooling along with fan.

Air is the cooling medium and blown with the aid of fan usually inside the enclosure. The cool air circulates inside the enclosure and passes through the gaps between the batteries. Then it is returned to a climate unit. The housing, also called enclosure, is well insulated and air sealed to minimise the cooling and heating demand. For heating the batteries, heaters might also be attached to the battery-shelf upon which the batteries are placed, to conduct heat into the batteries. Possible hydrogen gas from the batteries is evacuated by means of hoses from the valves on Valve Regulated Lead Acid, VRLA, batteries to the surrounding air outside the enclosure.

Temperature is a critical factor affecting battery life and performance. Thermo-chemical and thermo-electrical effects as well as environmental conditions results in temperature augmentation. However, chemical complexity of the VRLA battery cells makes it difficult to present an accurate model to describe the temperature profile in a battery cell. A battery block may consist of one or more battery cells in series. In each cell, an electrochemical process occurs. Experimental tests may give a vision about the temperature inside the battery but due to plastic casing of the battery there is a temperature difference about 2-7° C. between battery cell and wall of the battery. The plastic casing behaves as a thermal insulation and prevents effective heat transfer to the surroundings. Thus a large difference between the actual battery cell temperature and battery block's surface during continuous charging would expand the risk of thermal runway.

Bulk air cooling is a poor method to maintain tight temperature control over the batteries due to low heat transfer properties of air, small gaps available between the battery blocks (to let the air pass) and low thermal conductivity of the plastic battery casing. Furthermore, current cooling methods have some disadvantages. For example, active compressor cooling despite of high Coefficient of Performance, COP, and cooling capacity, is costly. COP is a ratio of achieved cooling energy to consumed energy by the compressor. Also, there is an environmental concern in case of any refrigerant's leakage. The Peltier cooler cannot manage thermal systems with medium to high heat demands (<200 W) and has low COP. Performance of the Peltier cooler depends on ambient temperature. Its cooling capacity decreases by increasing temperature difference. Although direct air cooling is cheap and easy to use and have suitable energy efficiency, it has a limited temperature range and requires a recurring air filter change.

Additionally, temperature is one of the main parameters that affects battery performance and lifetime. Desired operating temperature of VRLA batteries is 25° C. Increment of 10° C. reduces battery lifetime by 50%. This influence is most probable during standby mode of the battery called "float charging. The phenomenon "thermal runaway" causes major failure of the batteries, rapid hydrogen generation and hence explosion risk. A more efficient temperature control method is desired to minimise risk for thermal run away of batteries.

Moreover, the new IEC and Telcordia Standards require significantly more ventilation of the air and hydrogen gas inside the enclosures, and Telcordia prohibits the use of hoses. The heated or chilled air inside the battery enclosure would hence be lost to the environment in which the power consumption for heating and cooling would be increased.

SUMMARY

The object is to obviate at least some of the problems outlined above. In particular, it is an object to provide a battery and a battery thermal arrangement. These objects and others may be obtained by providing a battery and a battery thermal arrangement according to the independent claims attached below.

According to an aspect a battery is provided. The battery comprises one or more battery blocks and a thermal insert configured adjacent to a first battery block or between two battery blocks, the first battery block and a second battery block, the thermal insert comprising a channel for allowing a thermal medium flowing through the thermal insert, the thermal insert being in physical contact with at least a part of a side of the first battery block when filled with the thermal medium. The thermal insert comprises an inlet and an outlet connectable to a circulation device for pumping the thermal medium through the thermal insert.

According to an aspect, a battery thermal arrangement is provided. The battery thermal arrangement comprises one or more thermal inserts, the insert comprising a channel for allowing a thermal medium flowing through the thermal insert(s), a thermal unit for cooling or heating the thermal medium and a circulation unit for pumping the thermal medium through the one or more thermal insert(s).

The battery and the battery thermal arrangement have several possible advantages. One possible advantage is that the battery may be efficiently cooled, thereby prolonging battery life. The battery may be heated or cooled in order to keep it within optimal temperature range. The air around the battery blocks within the battery may be considered less important since the heat exchange is between the battery blocks and the thermal inserts. The battery enclosure meets IEC and Telcordia standards while keeping the batteries in desired temperature range. Still another possible advantage is the possibility of heating the battery to maintain discharge capacity in low ambient air temperature conditions. Yet another advantage is that standard battery blocks from several suppliers may be used in the battery. The battery has a high cooling capacity allowing shorter battery charging. Another possible advantage is uniformity of cooling of multiple battery blocks. The battery and its cooling are reliable terms of safety by reducing risk of rapid temperature growth and hence risk for thermal runaway. Yet another advantage is that the battery enclosure thermal insulation may be reduced as impact of ambient air on the battery block's temperature is reduced.

BRIEF DESCRIPTION OF DRAWINGS

Embodiments will now be described in more detail in relation to the accompanying drawings, in which.

DETAILED DESCRIPTION

Briefly described, a battery and a battery thermal arrangement, also called a battery thermal system, are provided. A battery comprises at least one battery block but often two battery blocks. Adjacent to one battery block or between two battery blocks, also called a battery block pair, a thermal insert is arranged which comprises a channel in which a thermal medium may flow. The thermal insert is in physical contact with at least a part of a battery block. The thermal medium may thus, as it flows through the thermal insert, absorb either heat or cold from the battery block(s) thereby either cooling or heating the battery block(s).

Embodiments of such a battery will now be described with reference to FIGS. 1a-1f.

Figure 1A:
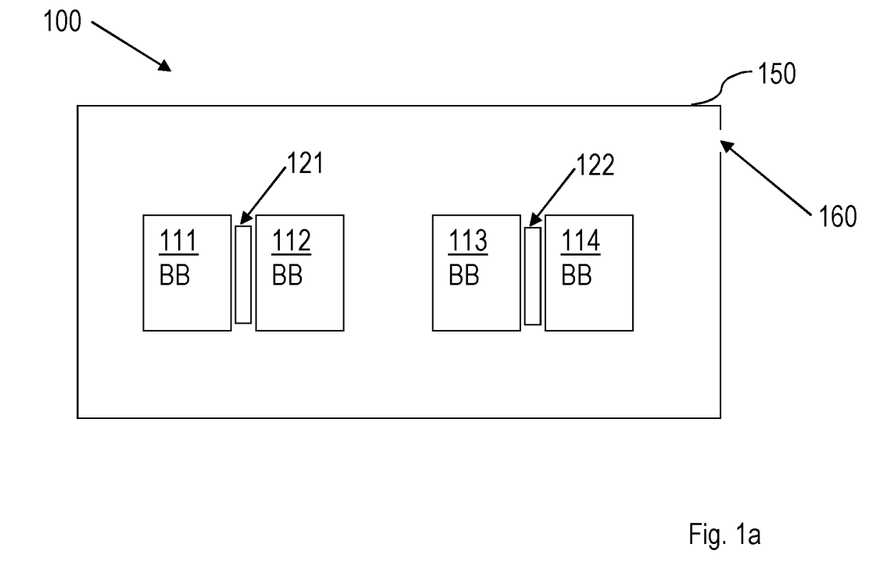
FIG. 1a is a schematic illustration of a battery according to an exemplifying embodiment.
Figure 1B:
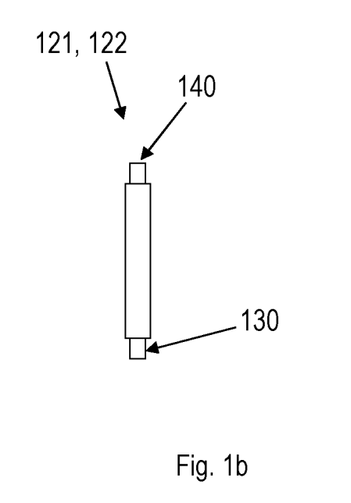
FIG. 1b is a schematic illustration of a thermal insert according to an exemplifying embodiment.
Figure 1C:
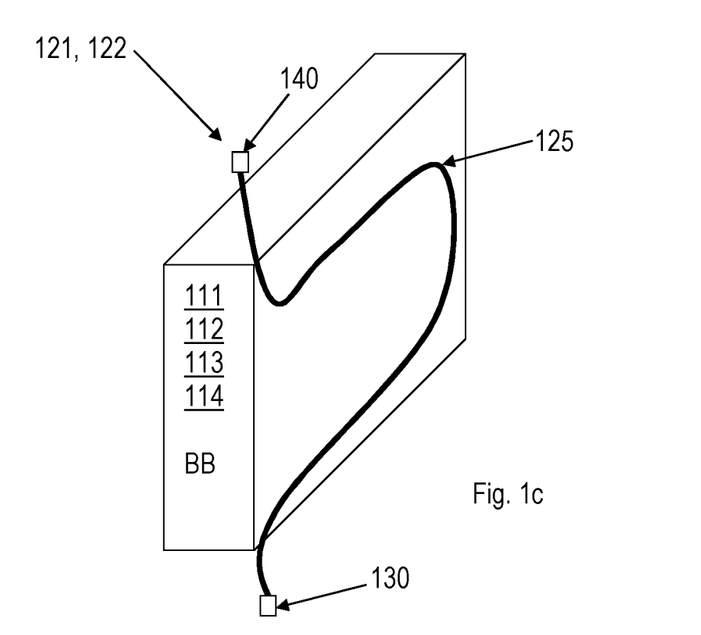
FIG. 1c is a schematic illustration of a battery block and a thermal insert according to an exemplifying embodiment.
Figure 1D:
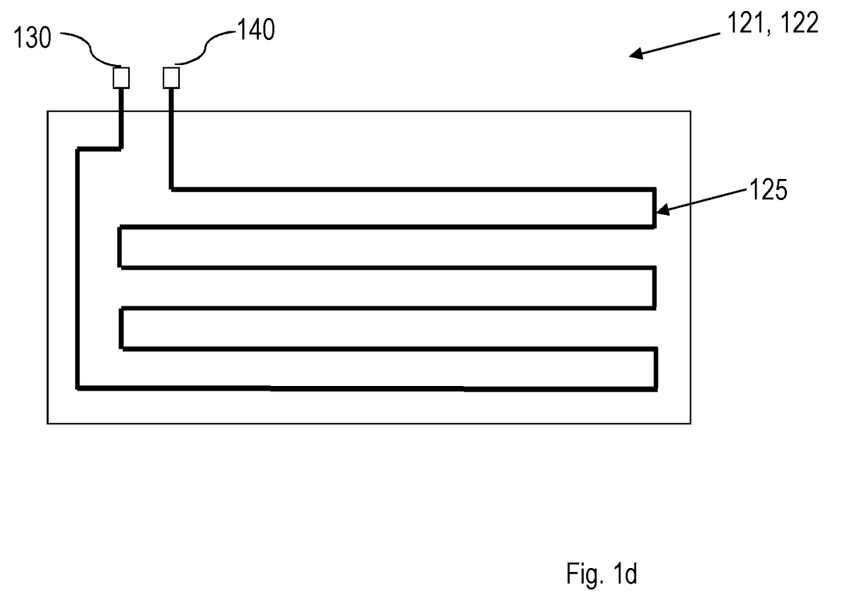
FIG. 1d is a schematic illustration of a thermal insert according to yet an exemplifying embodiment.
Figure 1E:
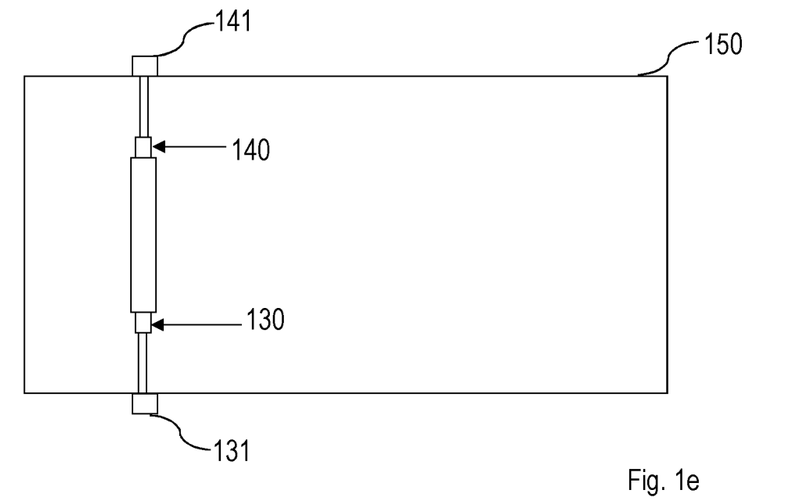
FIG. 1e is a schematic illustration of a battery housing and a thermal insert.
Figure 1F:
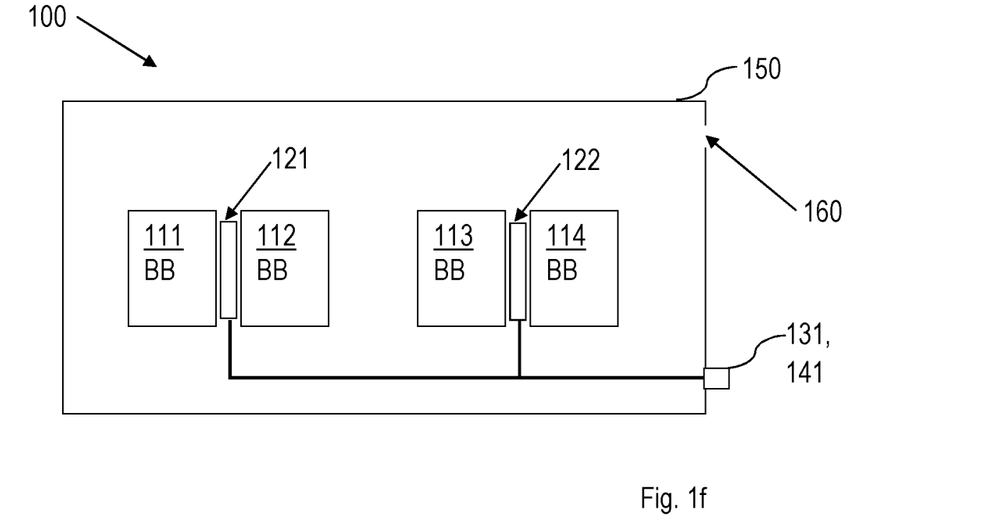
FIG. 1f is a schematic illustration of a battery according to yet an exemplifying embodiment.

FIG. 1f is an illustration of a battery 100 comprising one or more battery blocks 111, 112, 113, 114 and a thermal insert 121, 122 configured adjacent to a first battery block 111, 113 or between two battery blocks, the first battery block 111, 113 and a second battery block 112, 114, the thermal insert comprising a channel 125 for allowing a thermal medium flowing through the thermal insert, the thermal insert being in physical contact with at least a part of a side of the first battery block 111, 113 when filled with the thermal medium, the thermal insert 121, 122 further comprising an inlet 130 and an outlet 140 connectable to a circulation device for pumping the thermal medium through the thermal insert.

In FIG. 1a, the battery 100 is illustrated comprising four battery blocks 111, 112, 113, 114. The battery blocks are elements that may store charge. The battery blocks may be charged e.g. by connecting them to a power source and may, thereby charging the battery. The battery blocks may further, when comprising charge, be used as a power source, thereby using the battery as a power source.

FIG. 1a further illustrates the battery 100 comprising two thermal inserts 121, 122. In the example of the battery 100 only comprising one battery block, e.g. 111, and consequently only one thermal insert 121, the thermal insert is configured adjacent to the first battery block 111. In the example the battery 100 comprises two battery blocks 111 and 112, the battery also comprises one thermal insert 121, which is configured between the two battery blocks 111 and 112.

The thermal insert comprises a channel 125, e.g. a thermal medium distribution channel, for allowing a thermal medium flowing through the thermal insert. When no thermal medium is present in the channel 125, the thermal insert may or may not be in full physical contact with at least a part of a side of the first battery block 111 in the example of only one battery block 111; or the thermal insert may or may not be in full physical contact with at least a part of a side of the first battery block 111 and at least a part of a side of the second battery block 112. Typically, the first and the second battery block are placed relatively close to each other so that there is just enough room for the thermal insert between them. When the channel 125 is filled with the thermal medium, the thermal insert expands to be in physical contact with at least a part of a side of the first battery block 111 and/or at least a part of a side of the second battery block 112 depending on whether the battery comprises one or two battery blocks. It shall be pointed out that even if the battery is exemplified here as having only one or two batter blocks for simplicity reasons, the battery may have three, four, five or more battery blocks.

By the thermal insert being in physical contact with at least a part of a side of a battery block (the first, second, third etc.) especially when filled with the thermal medium, there may be an efficient exchange of heat and/or cold between the battery element and the thermal insert. The larger the part of the thermal insert being in physical contact with the battery block, the more heat/cold may be transferred between the thermal insert and the battery block. By the exchange of heat or cold between the battery element and the thermal insert means that (a) the thermal medium flowing through the channel of the thermal insert absorbs either heat or cold from the battery blocks, thereby cooling or heating the battery blocks; or analogously (b) that the battery blocks absorbs cold or heat from the thermal medium flowing through the channel of the thermal insert, thereby cooling or heating the battery blocks.

The thermal insert 121, 122 further comprises the inlet 130 and the outlet 140 connectable to the circulation device for pumping the thermal medium through the thermal insert, see FIG. 1b. By the thermal medium flowing through the thermal insert 121, 122 in the channel 125, the heat or cold that has been absorbed from the battery by the thermal medium may be transported to a heater or cooler in order for the thermal medium to be re-heated or cooled and then the thermal medium may again be pumped or circulated back to the thermal insert in order to absorb heat or cold anew.

The battery may have several advantages. One possible advantage is that the battery may be efficiently cooled, thereby prolonging battery life. The battery may be heated or cooled in order to keep it within optimal temperature range. The air around the battery blocks within the battery may be considered less important since the heat exchange is between the battery blocks and the thermal inserts. The battery meets IEC and Telcordia standards while keeping the batteries in desired temperature range. Still another possible advantage is the possibility of heating the battery to maintain discharge capacity in low ambient air temperature conditions. Yet another advantage is that standard battery blocks from several suppliers may be used in the battery. The battery has a high cooling capacity allowing shorter battery charging. Another possible advantage is uniformity of cooling of multiple battery blocks. The battery and its cooling are reliable terms of safety by reducing risk of rapid temperature growth and hence risk for thermal runaway. Yet another advantage is that the battery enclosure thermal insulation may be reduced as impact of ambient air on the battery block's temperature is reduced.

The battery 100 may further comprise a housing 150 in which the one or more battery blocks 111, 112, 113, 114 and the thermal insert 121, 122 are configured, wherein the inlet 130 and the outlet 140 of the thermal insert 121, 122 extends to a respective inlet 131 and outlet 141 of the housing 150.

The battery 100 is illustrated in FIG. 1a and FIG. 1e to comprise the housing 150. The housing may be provided with the inlet 131 and the outlet 141 as illustrated in FIG. 1e. It shall be pointed out that this may correspond to the inlet 130 and the outlet 140 of the thermal insert 121, 122 extending through the respective inlet 131 and outlet 141 of the housing 150, wherein the respective inlet 131 and outlet 141 of the housing 150 merely constitutes a hole through which the inlet 130 and the outlet 140 of the thermal insert 121, 122 may extend.

The inlet 131 and the outlet 141 may be provided with connecting means so that the thermal insert 121, 122 may be connected to the circulation device. In the example of the inlet 130 and the outlet 140 of the thermal insert 121, 122 extending through the housing by means of the inlet 131 and outlet 141 of the housing 150, the connecting means may be provided to the inlet 130 and the outlet 140 of the thermal insert 121, 122. The connecting means may be easy detachable connectors e.g. so-called non-spill connectors.

Since the battery blocks are cooled by means of the thermal insert 121, 122 and not by the air within the housing, the housing may be made smaller to comprise less air inside. Further, the housing of the battery may be not need to be as temperature isolating since the battery blocks are not heated or cooled by the air or gas within the housing 150 surrounding the battery blocks. In this manner, it is possible to keep the battery on a single battery shelf at a lower temperature than e.g. the air in a Radio Base Station, RBS, enclosure. The cooling or heating capacity is applied to where it is useful, leading to increased energy efficiency by decreasing the losses. The housing, also referred to as battery enclosure may be made at a lower cost with a cheaper standard enclosure.

In an example, the housing is made of metal and is equipped with a handle for easy placing, replacing and transporting if the battery by hand.

In an example, the thermal medium is a gas or a fluid.

There may be different examples of suitable thermal medium, One example is gas and an example of a gas may be air.

Another example of a thermal medium is a fluid, which may be a liquid. Different gases and/or fluids may have different temperature exchange properties and the battery may be used in an environment that is constantly relatively hot, constantly relatively cold, or changing quite much from hot to cold and cold to hot. Depending on where the battery is to be used, different thermal medium may be more or less suitable.

Merely as an example, assuming the battery may occasionally or constantly exposed to temperatures below zero degrees Centigrade, then pure water may be unsuitable as a thermal medium as it may freeze and damage the thermal insert and then also the battery.

In another example, the thermal medium comprises air, coolant, brine and/or water.

These are some more explicit examples of thermal mediums. Reverting to the example when the battery may occasionally or constantly exposed to temperatures below zero degrees Centigrade, a possible suitable thermal medium may be water mixed with an anti-freezing agent. For example, ethylene glycol may be added to the water. An advantage with having water as the thermal medium is that no direct hazardous affects are likely to arise from a leakage of thermal fluid. Another example of thermal medium is air, or filtered air. Air may have less favourable heat exchange properties compared to liquid, however air also has the advantage that a leakage of air is harmless.

Another example may be a thermal medium, a fluid, that may convert from liquid to gas, at relatively low temperature, for example refrigerants such as R134a.

Examples of a coolant are water with glycol, brine, refrigerants, and oil.

The housing 150 may further comprise a ventilation outlet 160 for allowing air or gas inside the housing to flow out from the housing.

The ventilation outlet 160 is illustrated in FIGS. 1a and 1f. Gases may form inside the housing for various reasons. In case these gases are not let out, pressure can build up inside the housing. The housing 150 (also referred to as enclosure) is thus provided with the ventilation outlet 160.

The thermal insert 121, 122 may comprise a thermal bag comprising the channel 125.

In this example the thermal insert may be in the shape of a bag comprising the channel 125. A schematic example is illustrated in FIG. 1d. In its simplest form, the thermal insert may comprise just the channel 125 as illustrated in FIG. 1c, however, in FIG. 1d, the thermal insert comprises a thermal bag which may be relatively thin, e.g. 0.5 mm to 5 mm, at the parts of the thermal bag not being occupied by the channel 125. It shall be pointed out that the above example of thickness is merely an example and the thermal insert may be thicker or thinner. The thermal bag 121, 122 may be thicker at the channel 125, especially when filled with the thermal medium. The thermal bag may be thin enough when not filled with the thermal medium so that it may be inserted between two battery blocks. The thermal bag should be thick enough, at least at the channel 125, when filled with the thermal medium so that the thermal bag is in physical contact with at least a part of the battery block(s), 111, 112.

In an example, the thermal insert 121, 122 is made out of a flexible material such that the thermal insert expands when the thermal medium is flowing through the thermal insert.

The thermal insert 121, 122 is in one example made out of a flexible material, e.g. plastic or rubber. It may be desirable to have the thermal insert made out of a material that is not only light in weight in order to not make the battery heavier than necessary. Further, it may be less expensive to make the thermal insert of such a material. Still further, in case a thermal inserts need to be replaced or arranged at the mounting of the battery, a thermal insert of a flexible material may facilitate the mounting of the battery and battery blocks, or the replacement of a thermal insert. The bag's cloth may be moved sideways. Once the thermal insert is pressurized, i.e. filled with the thermal medium, the thermal insert may expand and press towards the sides of the battery block(s). The sides do not have to be perfectly flat, the thermal insert will smoothly adapt to any protruding ridges or similar in the surface of the block(s).

As stated above, the battery has been explained by way of example and is not limited to one or two battery blocks. FIG. 1a may be "expanded to five, six or more battery blocks, wherein three or more thermal inserts would be comprised in the battery analogously as described above.

FIG. 1f illustrates an example of the battery 150 comprising four battery blocks 111, 112, 113 and 114, which are paired such that 111 and 112 constitute a first battery block pair and 113 and 114 constitute a second battery block pair. FIG. 1f illustrates the battery 150 comprising two thermal inserts 121 and 122 arranged such that the first thermal insert 121 is in physical contact with one side of battery block 111 and with one side of battery block 112. Analogously, the second thermal insert 122 is in physical contact with one side of battery block 113 and with one side of battery block 114. The channel 125 of the thermal inserts 121 and 122 is connected to and inlet 131 and an outlet 141. Not shown in FIG. 1f is that the inlet 131 and outlet 141 may be connected to a circulation unit for circulating or pumping the thermal medium through the thermal inserts by the channel 125. Further not illustrated in FIG. 1f is a heater or cooler in order for the thermal medium to be re-heated or cooled and then the thermal medium may again be pumped or circulated back to the thermal insert in order to absorb heat or cold anew.

Embodiments herein also relate to a battery thermal arrangement. Embodiments of such a battery thermal arrangement will now be described with reference to FIG. 2.

Figure 2:
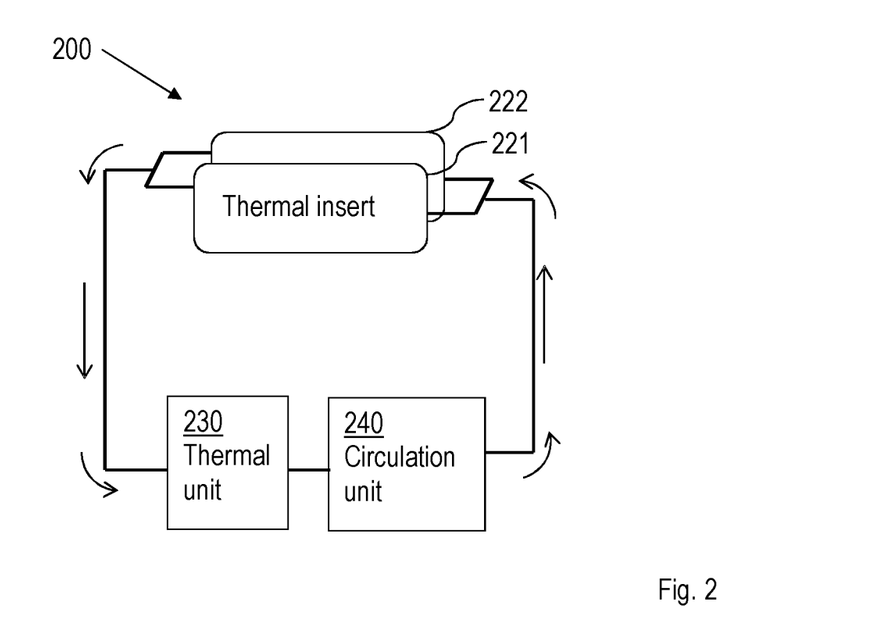
FIG. 2 is schematic illustration of a battery thermal arrangement according to an exemplifying embodiment.

FIG. 2 illustrates the battery thermal arrangement 200 comprising one or more thermal inserts 221, 222, the insert comprising a channel for allowing a thermal medium flowing through the thermal insert(s), a thermal unit 230 for cooling or heating the thermal medium and a circulation unit 240 for pumping the thermal medium through the one or more thermal insert(s) 221, 222.

FIG. 2 illustrates the battery thermal arrangement 200 comprising one or more thermal inserts 221, 222. The thermal insert(s) 221, 222 will be described in more detail below, see also the thermal insert(s) described above with regard to the battery 100. The thermal insert(s) 221, 222 comprises a channel for allowing a thermal medium flowing through the thermal insert(s). The channel is not shown in FIG. 2, however, the channel of the thermal insert corresponds to the channel 125 described with reference to the batter 100 and FIGS. 1a-1f.

The battery thermal arrangement 200 further comprises the thermal unit 230 for cooling or heating the thermal medium and a circulation unit 240 for pumping the thermal medium through the one or more thermal insert(s) 221, 222. In FIG. 2a, the circulation unit 240 is illustrated as pumping or circulating the thermal medium counter clock-wise. The thermal medium is pumped or circulated by and from the circulation unit 240, the thermal medium having a temperature T. The thermal medium flows through the thermal inserts 221, 222 thereby absorbing, through temperature exchange, heat or cold from battery block(s) of a battery. Consequently, as the thermal medium leaves the battery block(s) and thus also the thermal insert(s) 221, 222 and arrives at the thermal unit 230, the temperature is T+delta, where delta may be a positive or negative value depending on whether the thermal medium has absorbed heat or cold from the battery block(s) of the battery. Delta represents the difference in temperature. The thermal unit 230 may then cool or heat the thermal medium back to temperature T or at least close to temperature T, wherein the circulation unit 240 pumps, or circulates the thermal medium back to the thermal insert(s) 221, 221 again.

The battery thermal arrangement may have several advantages. One possible advantage is that the battery may be efficiently cooled, thereby prolonging battery life. The battery may be heated or cooled in order to keep it within optimal temperature range. The air around the battery blocks within the battery may be considered less important since the heat exchange is between the battery blocks and the thermal inserts. The battery meets IEC and Telcordia standards while keeping the batteries in desired temperature range. Still another possible advantage is the possibility of heating the battery to maintain discharge capacity in low ambient air temperature conditions. Yet another advantage is that standard battery blocks from several suppliers may be used in the battery. The battery has a high cooling capacity allowing shorter battery charging. Another possible advantage is uniformity of cooling of multiple battery blocks. The battery and its cooling are reliable terms of safety by reducing risk of rapid temperature growth and hence risk for thermal runaway. Yet another advantage is that the battery enclosure thermal insulation may be reduced as impact of ambient air on the battery block's temperature is reduced.

According to an embodiment, the thermal medium is a gas or a fluid.

There are different examples of suitable thermal medium, One example is gas and an example of a gas may be air.

There are also different examples of fluid as described above.

The thermal medium comprises air, coolant, brine and/or water.

Also as explained above, these are some more explicit examples of thermal mediums. Reverting to the example when the battery may occasionally or constantly exposed to temperatures below zero degrees Centigrade, a possible suitable thermal medium may be water mixed with an anti-freezing agent. For example, ethylene glycol may be added to the water. An advantage with having water as the thermal medium is that no direct hazardous affects are likely to arise from a leakage of thermal fluid.

Another example may be a thermal medium, a fluid, that may convert from liquid to gas, at relatively low temperature, for example refrigerants such as R134a.

Examples of a coolant are water with glycol, brine, refrigerants, and oil.

According to an embodiment, the thermal insert(s) 221, 222 comprises a thermal bag comprising a channel 125.

Also as explained above, with reference to FIGS. 1c and 1d, the thermal insert comprises a channel 125, e.g. a thermal medium distribution channel, for allowing a thermal medium flowing through the thermal insert.

By the thermal medium flowing through the thermal insert 221, 222 in the channel 125, and the thermal insert being in physical contact with a battery block, at least with regard to the channel 125, heat or cold that is absorbed from the battery blocks by the thermal medium, which may then be transported to the thermal unit 230 in order for the thermal medium to be re-heated or cooled and then the thermal medium may again be pumped or circulated back to the thermal insert(s) 221, 222 in order to absorb heat or cold anew.

According to an embodiment, the thermal insert(s) 221, 222 is made out of a flexible material such that the thermal insert(s) expands when the thermal medium is flowing through the thermal insert(s).

Again, as described above, the thermal insert(s) 221, 222 is in one example made out of a flexible material, e.g. plastic or rubber. It may be desirable to have the thermal insert made out of a material that is not only light in weight in order to not make the battery heavier than necessary. Further, it may be less expensive to make the thermal insert of such a material. Still further, in case a thermal inserts need to be replaced or arranged at the mounting of the battery, a thermal insert of a flexible material may facilitate the mounting of the battery and battery blocks, or the replacement of a thermal insert. The bag's cloth may be moved sideways. Once the thermal insert is pressurized, i.e. filled with the thermal medium, the thermal insert may expand and press towards the sides of the battery block(s). The sides do not have to be perfectly flat, the thermal insert will smoothly adapt to any protruding ridges or similar in the surface of the block(s).

According to yet an embodiment, the circulation unit 240 comprises a fan or a pump.

In order for the thermal medium to flow or circulate through the battery thermal arrangement and the thermal insert(s) 221, 222, the battery thermal arrangement comprises the circulation unit 240. As described above, the thermal medium may be a gas or a fluid.

When the thermal medium is a gas, then a fan is an appropriate implementation of the circulation unit 240. When the thermal medium is a fluid or liquid, the circulation unit 240 may be a pump.

According to still an embodiment, wherein the thermal unit 230 comprises a compressor cooling/heating unit; a thermal electric module; an electrical heater/cooler; or a heat exchanger.

As the thermal medium is heated or cooled when passing through the channel of the thermal inserts, by absorbing heat or cold from the battery blocks of the battery, the thermal medium needs to be either cooled or heated by the thermal unit 230.

The thermal unit may be implemented in different ways, e.g. depending on how and where the battery is used and also depending on the thermal medium. The thermal unit 230 may be implemented as a compressor cooling/heating unit; a thermal electric module; an electrical heater/cooler; a heat exchanger; or a combination thereof.

The thermal insert(s) 121, 122 may further comprise a frame in order to avoid that the thermal insert(s) folds when being placed between battery blocks. The frame may also help to facilitate easy installation/removal of the thermal insert(s) 121, 122. The thermal insert(s) 121, 122, or the frame of the thermal insert(s), may further comprise a handle for easy installation/removing of the thermal insert(s) 121, 122 between battery blocks without the need to move the battery blocks.

In general, a mechanical heat pump makes use of physical properties of a volatile evaporating and condensing fluid, e.g. a refrigerant. The heat pump compresses the refrigerant to make it hotter on the side to be warmed, and releases the pressure at the side where heat is absorbed. The working fluid, in its gaseous state, is pressurised and circulated through the system by a compressor. On the discharge side of the compressor, the now hot and highly pressurised vapour is cooled in a heat exchanger, also called a condenser, until it condenses into a high pressure, moderate temperature liquid. The condensed refrigerant then passes through a pressure-lowering device also called a metering device.

Figure 3A:
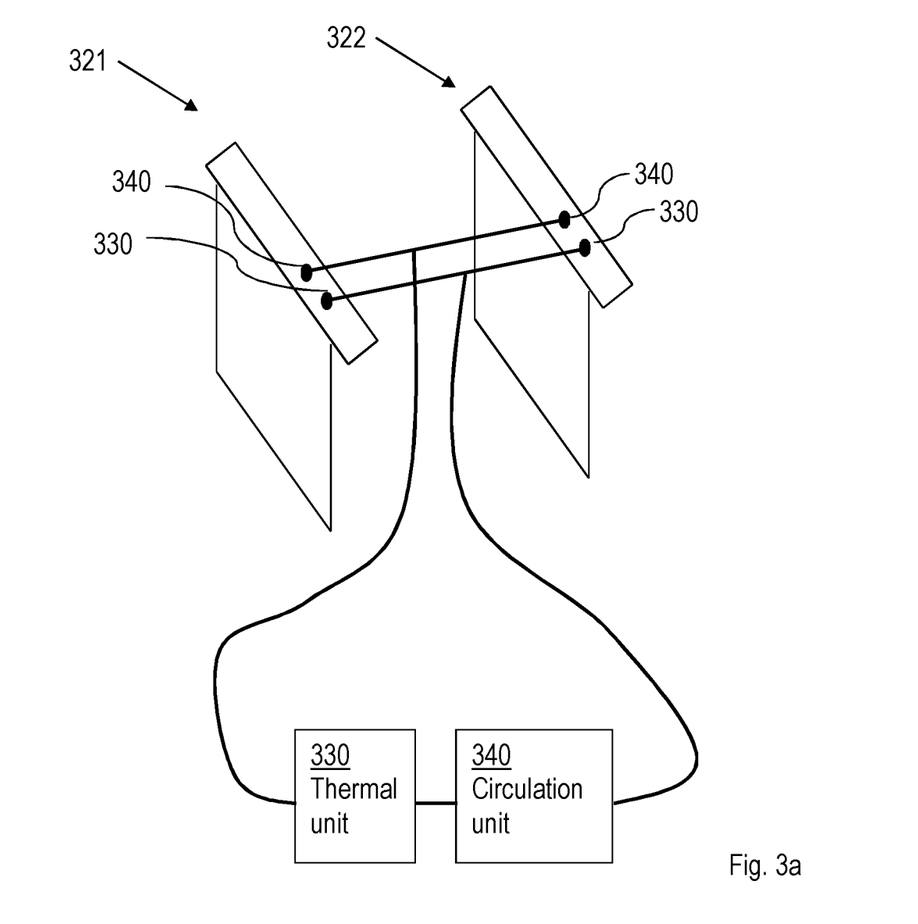
FIG. 3a is schematic illustration of a battery thermal arrangement according to yet an exemplifying embodiment.

FIG. 3*a* is an illustration of a battery thermal arrangement comprising two thermal inserts 321 and 322, a thermal unit 330 and a circulation unit. The thermal inserts 321 and 322 comprises a channel (not shown) for allowing a thermal medium to flow through the thermal inserts. In an example, the thermal medium is brine and the battery thermal arrangement may be said to be an indirect refrigeration system in which brine acts as a secondary refrigerant and transports energy from the heat source (batteries) to an evaporator. A proper refrigerant inside the evaporator absorbs heat from the brine and turns into vapour. Then a compressor increases the refrigerant's pressure and finally it is cooled inside a condenser. Thus heat generated by batteries is dissipated from the housing or enclosure to the surrounding. After getting cold inside the evaporator, the brine is pumped to the thermal inserts again. Thermal inserts may sit and be easily removed between the battery blocks without need to moving the battery blocks as explained above.

One advantage of this battery thermal arrangement is simplicity of installation. There is no need to move the battery blocks to push in or out the thermal inserts. Installation procedure is as following:

1. Insert the thermal inserts. Antifriction material might be used in order to place the thermal inserts easily between two battery blocks. Thermal inserts may be made of a flexible material with a metal frame. Rounded edges may help to the cooling bag to easily placed between the battery blocks as well.
2. Quick connectors (Couplings) may be used to join the cooling bags to the thermal unit and the circulation unit.
3. Activate the arrangement.

Figure 3B:
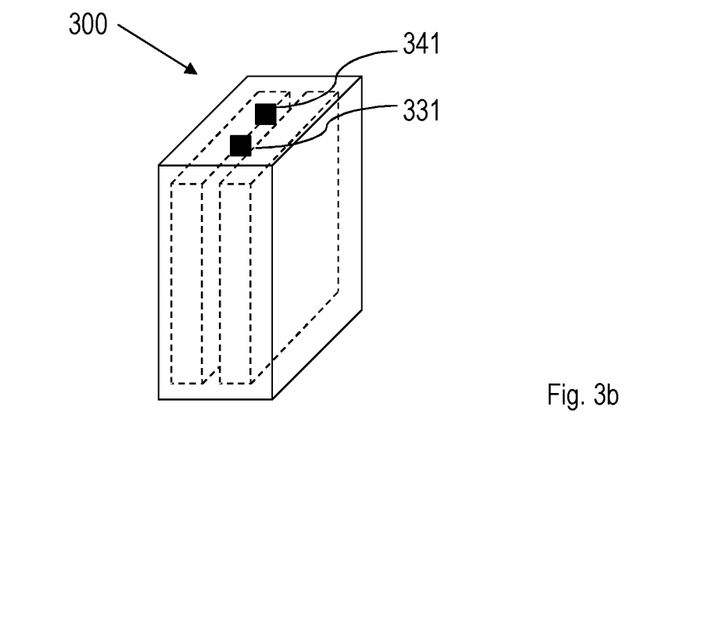
FIG. 3b is a schematic illustration of a battery according to an exemplifying embodiment.

FIG. 3*b* is an illustration is an illustration of a battery 300. The battery 300 comprises an inlet 331 and an outlet 341, corresponding to the inlet 131 and outlet 141 previously described. The battery is schematically illustrated comprising two battery block inside by dotted boxes. Although not shown, the battery 300 also comprises at least one thermal insert arranged between the two battery blocks, the thermal insert comprising a channel through which, a thermal medium may flow for absorbing heat or cold from the battery blocks. The battery 300 is illustrated comprising an inlet 331 and an outlet 341 connected to the thermal insert (s), wherein the thermal medium may flow in through the inlet 331, through the thermal insert(s), absorb heat or cold from the battery blocks and then flow out of the battery through the outlet 341 to the thermal unit and the circulation unit as described above. The inlet 331 and the outlet 341 may comprise couplings, such as quick connectors, so that the battery may easily be connected to the thermal unit and the circulation unit, wherein the thermal insert(s) and the thermal unit and the circulation unit may form the battery thermal arrangement, also called a thermal system, as described above with reference to FIGS. 2 and 3*a*.

Figure 3C:
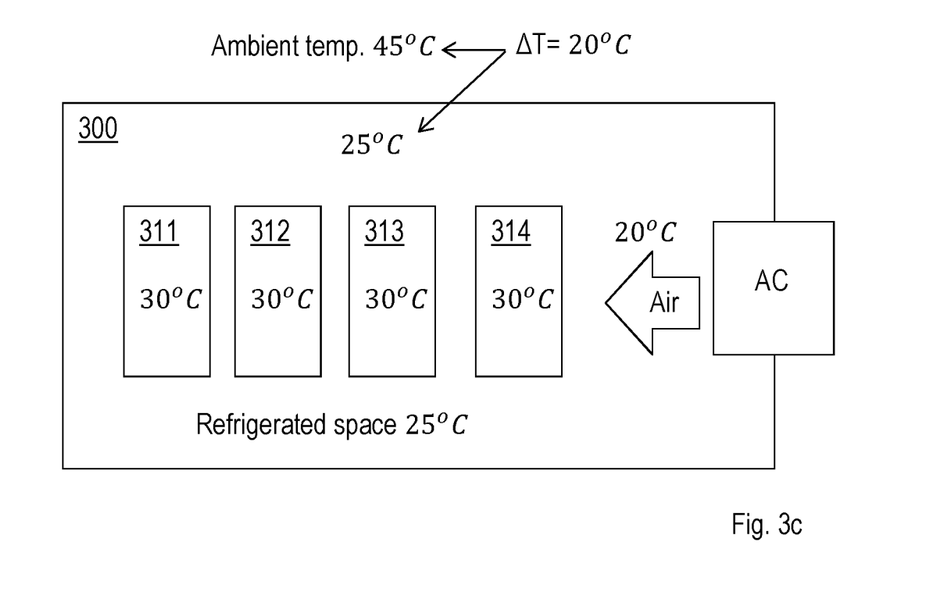
FIG. 3c is a schematic illustration of a battery according to prior art.

FIG. 3*c* is an illustration of prior art in which relatively cool air is pumped into the housing or enclosure of the battery, which then should be insulated to minimise the heat loss from the battery compartment. Accordingly, the refrigerated space is the whole internal volume of the housing/enclosure. FIG. 3*c* illustrates a battery housing in which an air conditioning unit inside or close to the compartment may provide cold air at e.g. 20° C. Cold air spreads all over the compartment and in contact with hot battery blocks, cools them into 30° C. in this example. Due to heat transfer between air and battery blocks, the surrounding air inside the cabinet would have temperature of 25° C. Therefore the temperature difference between inside the battery compartment and ambient (of 45° C.) is 20° C.

Figure 3D:
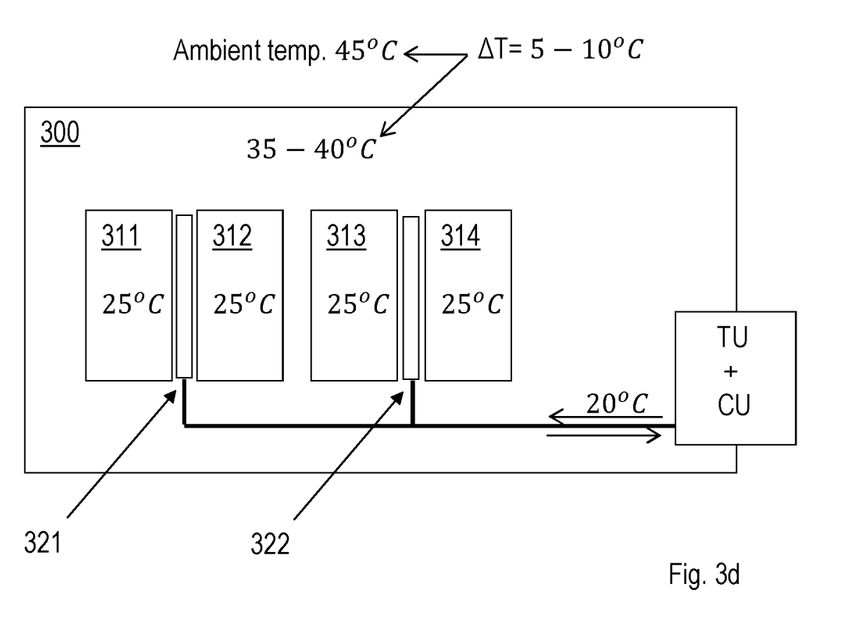
FIG. 3d is a schematic illustration of a battery according to still an exemplifying embodiment.

FIG. 3d is an illustration of the battery and the battery thermal arrangement as described above with reference to FIGS. 1a-1f and FIG. 2. In the example illustrated in FIG. 3d, the battery comprises four battery blocks and two thermal inserts. Using two thermal inserts between the battery blocks may lead to a local contact cooling between battery blocks and thermal insert. In this case, there is no need to cool the whole battery enclosure, thus less energy is required to cool the battery due to more effective cooling. As FIG. 3d shows, the battery block temperature is lower than the case with air conditioning in FIG. 3c. The rest of the battery enclosure has a temperature between 35-40° C. Temperature difference between inside the battery enclosure and ambient (of 45° C.) is 5-10° C. This provides an opportunity to use an enclosure/housing with less insulation. Therefore it is possible to ventilate possibly produced $H_2$ by batteries to the ambient with lower heat loss by means of an opening. Consequently the new standards by IEC and Telcordia for battery compartment ventilation may be met.

Figure 3E:
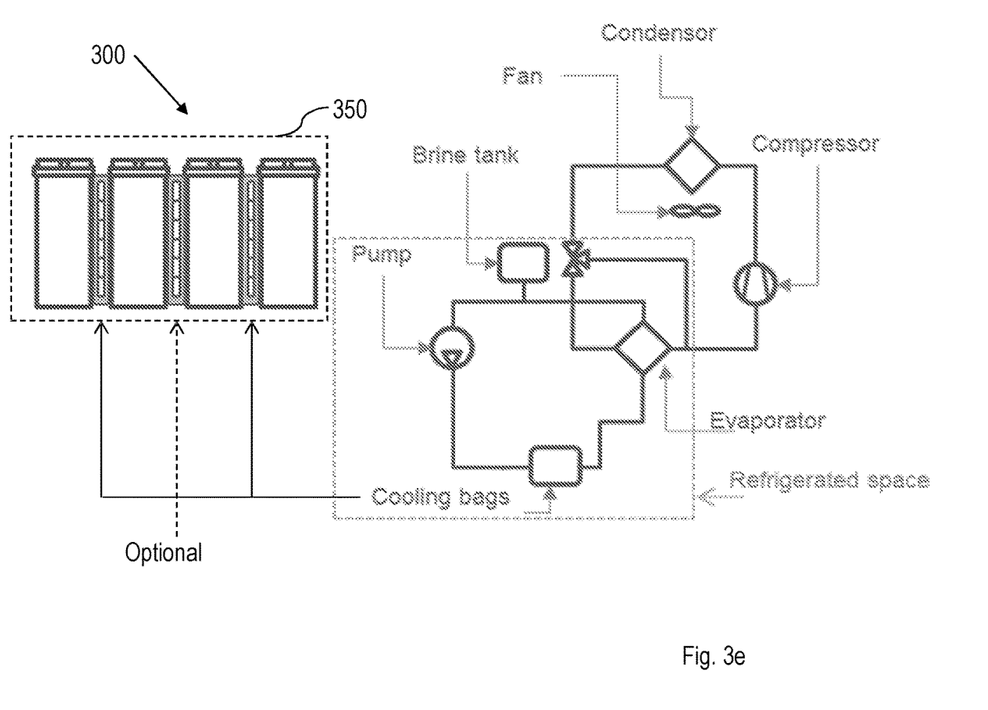
FIG. 3e is a schematic illustration of a battery and a battery thermal arrangement according to an exemplifying embodiment.

FIG. 3e is an illustration of the battery and the battery thermal arrangement as described above with reference to FIGS. 1a-1f and FIG. 2. In the example illustrated in FIG. 3e, the thermal medium is brine and the battery comprises 4 battery blocks. In this example, there are three thermal inserts, however, only two may be required and the "middle one" in the figure is thus optional. In FIG. 3e, the above described thermal unit and circulation unit are implemented as one unit.

Figure 3F:
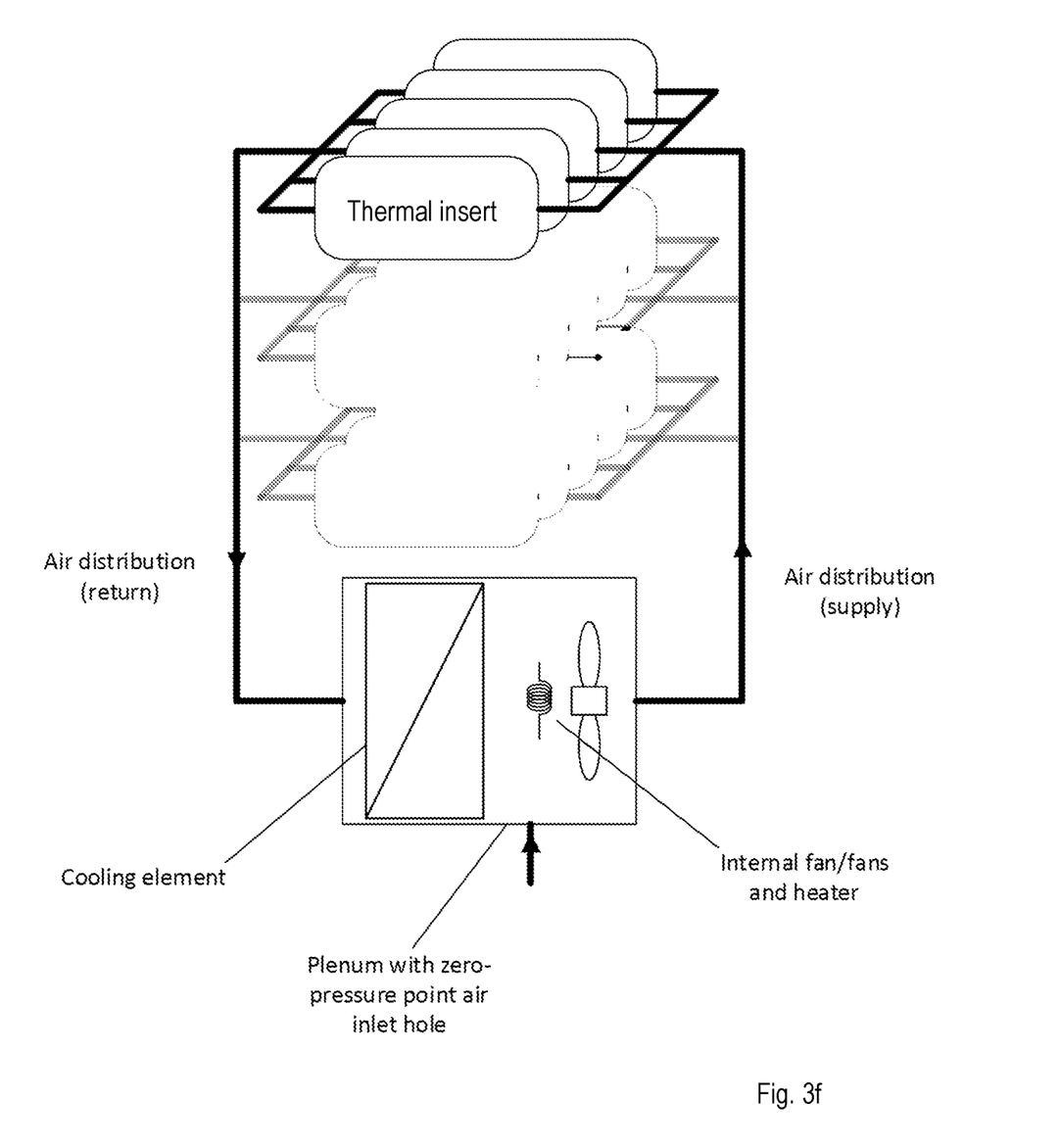
FIG. 3f is schematic illustration of a battery thermal arrangement according to still an exemplifying embodiment.
Figure 3G:
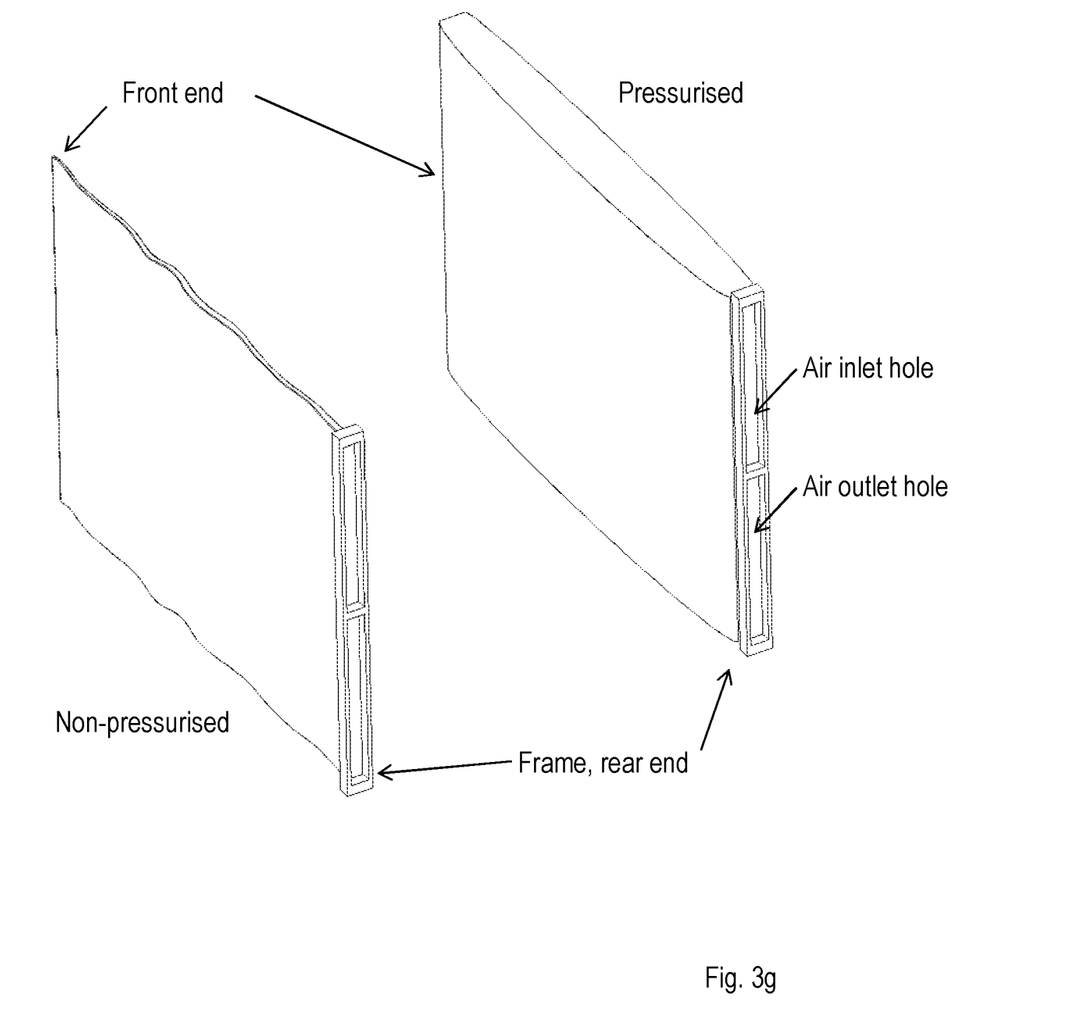
FIG. 3g is a schematic illustration of thermal inserts according to an exemplifying embodiment.
Figure 3H:
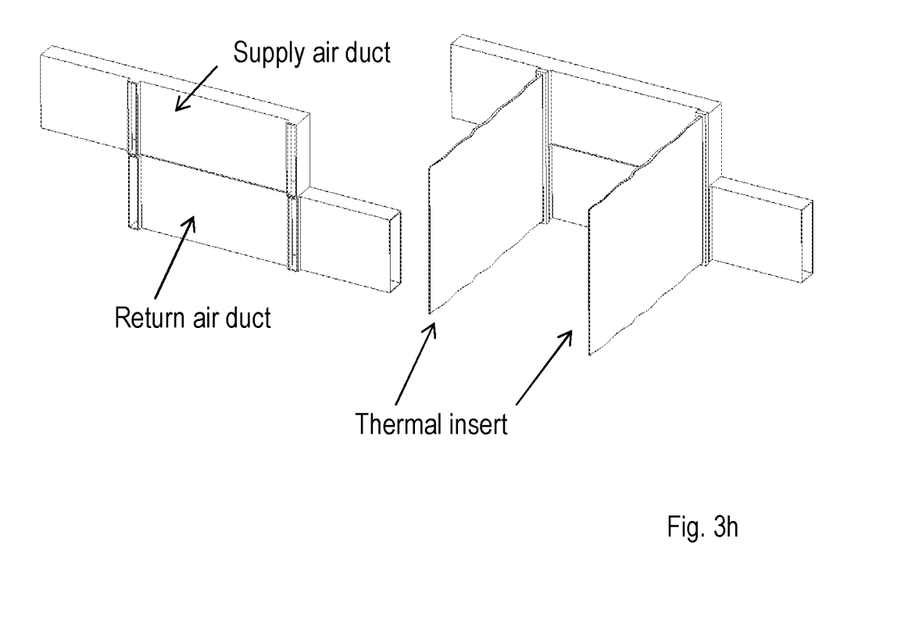
FIG. 3h is a schematic illustration of a frame and thermal inserts according to an exemplifying embodiment.
Figure 3I:
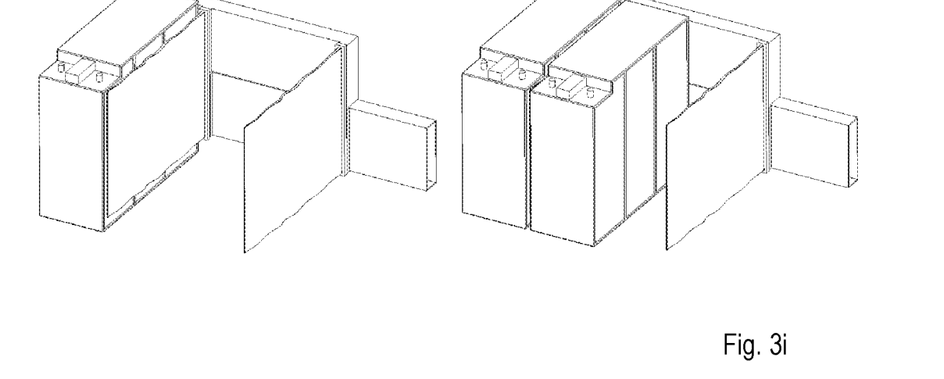
FIG. 3i is a schematic illustration of a frame, batteries and thermal inserts according to an exemplifying embodiment.
Figure 3J:
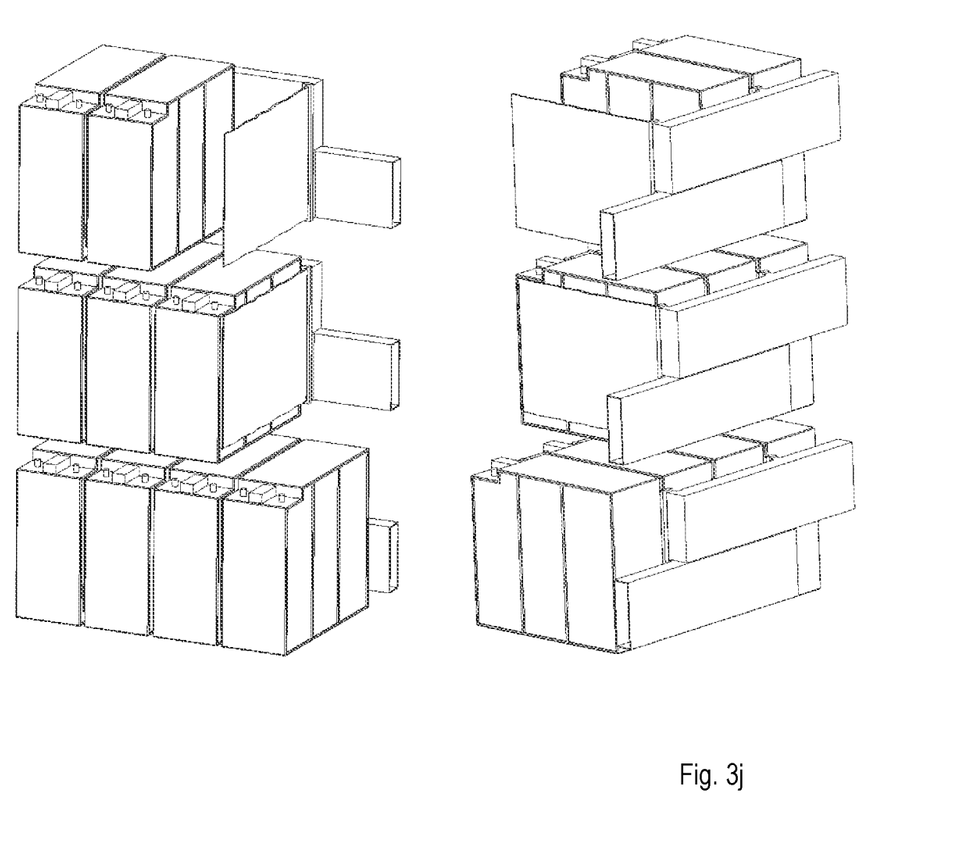
FIG. 3j is a schematic illustration of a frame, batteries and thermal inserts according to still an exemplifying embodiment.

FIG. 3f is an illustration of an example of the battery thermal arrangement 200 described above with reference to FIG. 2. In this example, the thermal medium may be air. A cooling element may be a part of an active cooling device (i.e. an evaporator in a compressor active cooling system), capable of maintaining the supply air at sub-ambient temperatures. A heater device may be provided in order to raise the temperature of the supply air above ambient air temperatures, if needed. An internal fan maintains the airflow and the over-pressure within the system. In this example, the cooling element and the heater correspond to the thermal unit and the fan corresponds to the circulation unit.

To ensure good thermal coupling between the thermal inserts and the battery block's sides, an over-pressure should be provided inside the thermal inserts. This may be secured by defining a "zero-pressure reference point", simply by opening a hole with a defined cross section opening, at the suction side of the air distributing (internal) fan/fans.

An active cooling (compressor cooling) may be used in any cabinet or enclosure applications, designed more or less as open, or to a limited extent sealed, from the ambient air entering. A special example is an enclosure using a heat exchanger for cooling of its internal parts. Here the air inside the enclosure may be hotter than the ambient. The air distributed to the thermal inserts could in such a situation be taken from the ambient.

The thermal inserts may come in different shapes and sizes, and have different principles for air paths (front-to-back, top-to-bottom, etc.). Common for all is that e.g. cooled air enters the thermal insert, provides an over-pressure which expands the thermal insert, and heated air is exhausted.

In FIGS. 3g-3j, a thermal insert where air is entered and exhausted through a common frame placed at the rear end is used. The thermal insert also may need some sort of support at the "front" end (e.g. the opposite to the frame side) which is not shown in the figures.

In the examples illustrated in the figures, the frame is attached to a fix structure (i.e. a cabinet wall or similar) and an air distribution system, made of hoses or ducts, are connected to the inlet and outlet holes on the frame. One duct supply the air to the bags, and the other returns the exhausted air back to the cooling element.

When placing the battery blocks onto the shelf, first stop the fan so the thermal inserts become flexible. Start at one side by placing the first block. Continue with next and ascertain that the thermal bag is not squeezed. Continue with the remaining two blocks. The system is expandable to several battery shelves both in vertical as well as in horizontal directions, provided that the air ducts are connected to a common air distribution and cooling node (not shown in the pictures).

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A battery comprising;
   a plurality of battery blocks;
   a thermal insert configured adjacent to a first battery block of the plurality of battery blocks or between two battery blocks, including the first battery block and a second battery block of the plurality of battery blocks, the thermal insert comprising a channel for allowing a thermal medium to flow through the thermal insert, the thermal insert being in physical contact with at least a part of a side of the first battery block when filled with the thermal medium, the thermal insert further comprising an inlet and an outlet connectable to a circulation device for pumping the thermal medium through the thermal insert; and
   a housing in which the plurality of battery blocks and the thermal insert are configured, wherein the inlet and the outlet of the thermal insert are directly fluidly connected to a respective inlet and outlet of the housing.

2. The battery according to claim 1, wherein the thermal medium is a gas or a fluid.

3. The battery according to claim 1, wherein the thermal medium comprises at least one of air, coolant, brine and water.

4. The battery according to claim 1, wherein the housing further comprises a ventilation outlet for allowing air or gas inside the housing to flow out from the housing.

5. The battery according to claim 1, wherein the thermal insert comprises a thermal bag comprising the channel.

6. The battery according to claim 1, wherein the thermal insert is made out of a flexible material such that the thermal insert expands when the thermal medium is flowing through the thermal insert.

7. A battery thermal arrangement comprising;
   a plurality of battery blocks;

a plurality of thermal inserts, each thermal insert comprising an inlet, an outlet, and a channel for allowing a thermal medium to flow therethrough;

a thermal unit for cooling or heating the thermal medium;

a circulation unit for pumping the thermal medium through the plurality of thermal inserts; and a housing in which the plurality of battery blocks and the plurality of thermal inserts are configured, wherein the housing comprises a housing inlet and a housing outlet, and wherein the inlet and the outlet of each of the plurality of thermal inserts are directly fluidly connected to the housing inlet and the housing outlet respectively.

8. The battery thermal arrangement according to claim 7, wherein the thermal medium is a gas or a fluid.

9. The battery thermal arrangement according to claim 7, wherein the thermal medium comprises at least one of air, coolant, brine and water.

10. The battery thermal arrangement according to claim 7, wherein each thermal insert comprises a thermal bag comprising a channel.

11. The battery thermal arrangement according to claim 7, wherein the plurality of thermal inserts is made out of a flexible material such that the plurality of thermal inserts expands when the thermal medium is flowing therethrough.

12. The battery thermal arrangement according to claim 7, wherein the circulation unit comprises a fan or a pump.

13. The battery thermal arrangement according to claim 7, wherein the thermal unit comprises: a compressor cooling/heating unit; a thermal electric module; an electrical heater/cooler; or a heat exchanger.

\* \* \* \* \*